United States Patent
Adams

(10) Patent No.: US 7,178,543 B2
(45) Date of Patent: Feb. 20, 2007

(54) RAPID HOT WATER APPARATUS AND METHOD

(76) Inventor: Charles L. Adams, P.O. Box 100909, Fort Worth, TX (US) 76185

(*) Notice: Subject to any disclaimer, the term of this patent is extended or adjusted under 35 U.S.C. 154(b) by 38 days.

(21) Appl. No.: 11/167,798

(22) Filed: Jun. 27, 2005

(65) Prior Publication Data

US 2006/0289065 A1  Dec. 28, 2006

(51) Int. Cl.
F03B 1/00 (2006.01)
F16K 49/00 (2006.01)

(52) U.S. Cl. .................. 137/1; 137/15.01; 137/337; 137/563; 137/624.11; 251/129.04

(58) Field of Classification Search .............. 137/1, 137/334, 337, 563, 624.11; 251/129.04
See application file for complete search history.

(56) References Cited

U.S. PATENT DOCUMENTS

| | | | |
|---|---|---|---|
| 2,842,155 A | 7/1958 | Peters | 137/337 |
| 3,812,872 A * | 5/1974 | Block et al. | 137/62 |
| 3,885,584 A | 5/1975 | Hock | 137/115 |
| 4,563,780 A | 1/1986 | Pollack | 4/192 |
| 4,756,030 A * | 7/1988 | Juliver | 4/668 |
| 4,854,499 A | 8/1989 | Neuman | 236/93 |
| 4,923,116 A * | 5/1990 | Homan | 236/12.12 |
| 4,945,942 A * | 8/1990 | Lund | 137/337 |
| 5,287,570 A | 2/1994 | Peterson et al. | 4/626 |
| 6,164,307 A | 12/2000 | Byles | 137/1 |
| 7,000,631 B2 * | 2/2006 | LaPrise | 137/337 |
| 7,073,528 B2 * | 7/2006 | Kempf et al. | 137/337 |

* cited by examiner

Primary Examiner—A. Michael Chambers
(74) Attorney, Agent, or Firm—Charles D. Gunter, Jr.

(57) ABSTRACT

An apparatus is shown for attachment to a plumbing system for the rapid on-demand delivery of hot water through the plumbing system to an ultimate point of use. The apparatus includes a diverter valve located in a hot water supply line upstream of the point of use. The diverter valve is actuated for a predetermined interval by a user to initially purge cold water from the hot water line to a drain. After the preset interval, the valve automatically closes. The initial diversion of cold water standing in the water supply line causes rapid delivery of hot water to the point of use once the diverter valve has completed its cycle.

21 Claims, 4 Drawing Sheets

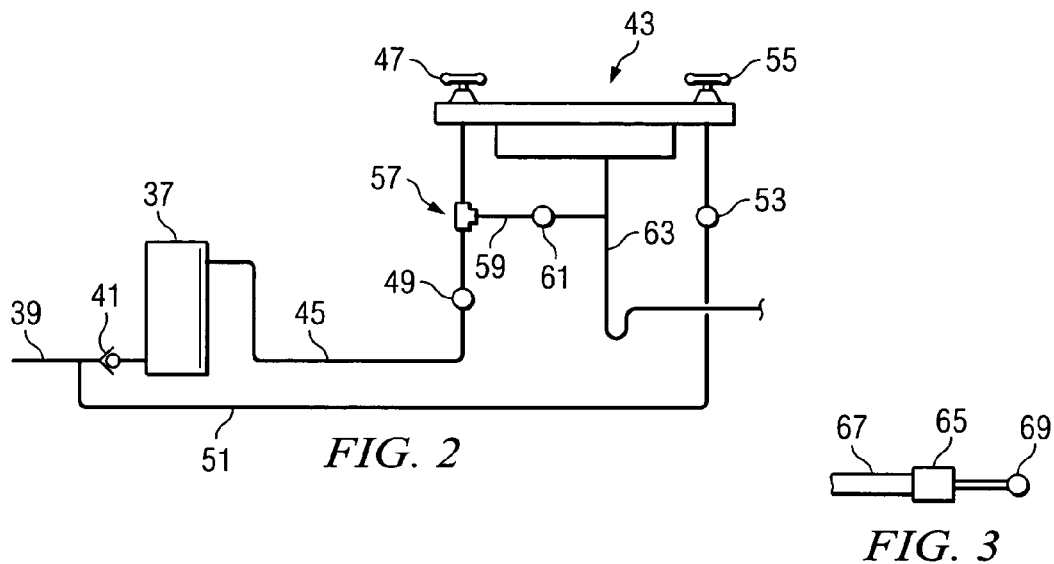
*FIG. 2*
*FIG. 3*
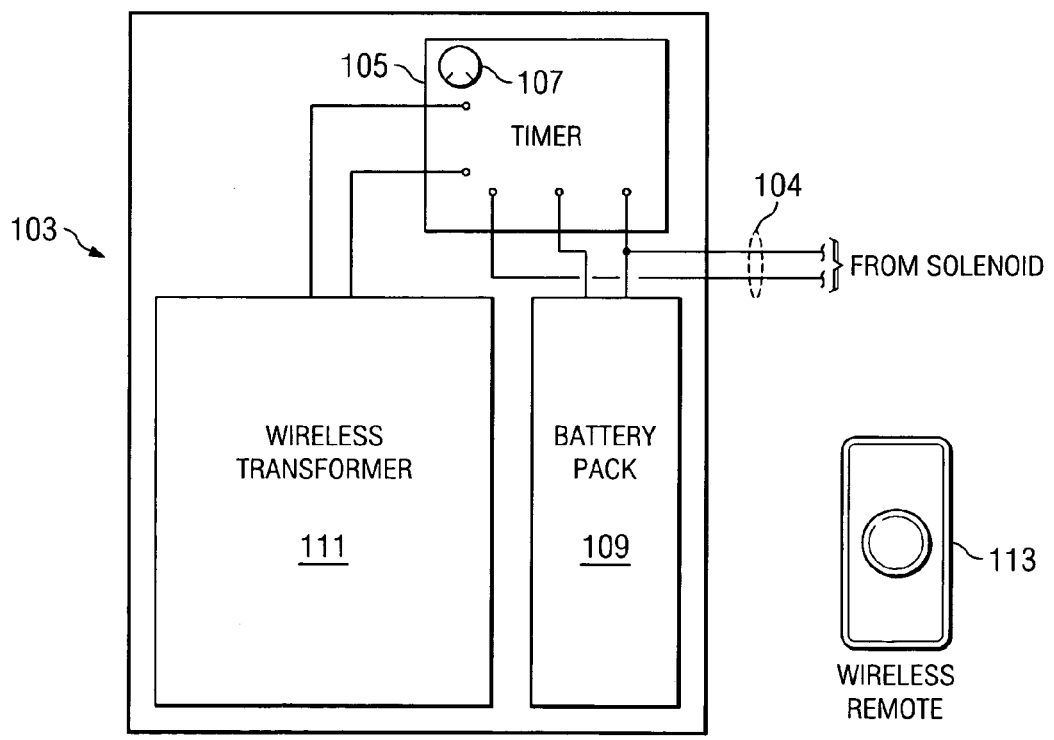
*FIG. 4*

RAPID HOT WATER APPARATUS AND METHOD

BACKGROUND OF THE INVENTION

1. Field of the Invention

The present invention relates generally to an apparatus and system for providing rapid hot water on-demand from a source, such as a water heater or boiler, to a point of use, such as the tap of a sink in a potable water system.

2. Description of the Prior Art

The present invention has application for homes, industrial or commercial buildings, or other structures having water lines which convey water from a source of hot water to an ultimate point of use, such as a kitchen or lavatory sink, a tub or shower, or other tap for dispensing hot water. Many existing structures have hot and cold water lines which discharge at a point of use with the discharge being controlled by a manual faucet in each line, or through a blending faucet common to both lines. The discharged water then passes down a discharge drain to the sewer system. In a typical residential, industrial or commercial installation, the water lines are contained in walls or flooring and distribute water to various commonly known discharge points. The water heater or boiler which supplies the hot water to the system is often located on the order of 10 to 150 feet or more from the various discharge points.

A common problem with potable water systems of the type described having an associated hot water source is that once the tap, valve or faucet controlling the flow of the water from the heated source is turned off, the water which is left in the line between the valve and the water heater or boiler gradually cools over time. The hot water line will lose heat in accordance with a number of variables, such as the nature of the conduit material conveying the water, the surrounding insulation, the temperature differential with the ambient surroundings, and the length of the line from the hot water source to the point of use where it is discharged. If a sufficient amount of time has elapsed before the hot water from that tap is again required, the user must wait until the cooled water within the line is evacuated through the lavatory drain and the hot water line is once again filled with hot water. The problem is usually worse in the case of large, single story homes, which tend to be more spread out than multilevel homes, where the water heater can be great distances from the farthest tap. A user may be forced to wait several minutes for the cooled water in the line to evacuate before hot water arrives at the tap location. The same process is repeated over and over during a typical day as water is allowed to cool again prior to repeated usage.

A number of different solutions to the above problem have been suggested in order to provide hot water rapidly at remote taps from the water heating device. One such solution is a recirculating system in which a return line is plumbed from the most remote tap back to the water heater source with a recirculating pump installed to provide a continuous flow of water. The flow ensures a supply of warm water contained in the plumbed line so that whenever the tap is turned on, warm water flows. There are a number of drawbacks with such a system, however. There is typically a relatively large up-front cost in installing such a system. It is usually necessary that the system be installed as a part of new construction. In other words, it is not easy to retrofit existing structures with circulating or recirculating systems. It is difficult or impossible to adequately insulate such systems in order to avoid unnecessary energy loss. In addition to the return line, an electrical pump is usually installed. The pump must be maintained and is subject to failures. In addition, there is an increase in electrical costs associated with the pump and the additional load on the water heater.

Another proposed solution for the problem of supplying rapid hot water is to provide a "point source" instant hot water device. Such devices are typically installed directly below the tap where the hot water is desired. The supplemental point source heating device is typically powered by an AC electric power source and is relatively expensive to install. The point source device usually has a small storage capacity of only a few gallons. The heat source is typically a resistance heating element, making such systems inefficient and expensive to operate in terms of relative energy costs.

Another more exotic solution to the problem is the so-called "convective circulating loop." These type systems operate on the principal that in a closed recirculating flow loop, warm water will rise and cool water will fall, providing a continuous recharge of warmed water into the loop, from which taps and valves are operated. In this type system, a return loop segment is run from the farthest hot water tap back to the water heater. A venturi is typically provided to initiate flow, and a check valve is included to prevent back flow of water in the return line when the cold tap is operated. The plumbed return loop enters the cold water line just before the water heater device. However, there are also known drawbacks with the convective circulating loop type system. In order to operate, the return loop must be above the water heater. This generally limits the use of such systems to multi-story homes or buildings with the plumbing occurring above the level of the heated water source. If the system is installed in a typical one-story slab home with the potable water plumbing installed through the slab, then the necessary rise of warmed water and fall of cooled water will not take place. Another disadvantage of the system is the cost of running the return loop line in an existing home, typically limiting the application to professional plumbers. Again it is difficult to adequately insulate such systems and they tend to be relatively expensive from an energy point of view to operate.

To summarize, the most commonly used prior art systems, of the type described, are all relatively costly to purchase, install and operate in terms of energy costs. All typically require the services of a professional plumber for installation. The first two systems typically require an AC power source to operate, and the third system requires the plumbing to be above the heated water source to operate.

An object of the present invention is to provide a system for supplying rapid hot water on-demand at a point of use, which system is easy to install, relatively economical to purchase, and which can be operated from a DC power source, such as a battery source, if desired.

Another object of the present invention is to provide a system for supplying rapid hot water on-demand at a point of use, which system is easy to install, relatively economical to purchase, and which can be operated from an AC power source if desired.

Another object is to provide such a system which does not require that the presence of a return loop which is located at an elevation above the level of the heated water source.

Another object of the invention is to provide a system for supplying rapid hot water on-demand at a point of use where the system can be easily installed, for example, at a location below a lavatory sink associated with a discharge tap using simple tools and with a minimum of trouble or expense.

Another object of the invention is to provide such a system which can be easily installed by a homeowner without the necessity of employing a professional plumber.

Another object is to provide such a system which can be easily and economically installed by a home builder during new home construction, including hard wiring the system for AC power, in order to provide rapid hot water in the home with little additional expense to the ultimate home purchaser.

SUMMARY OF THE INVENTION

It is accordingly the general object of the present invention to provide a novel, rapid, hot water delivery method and apparatus to overcome the above-described limitations and other problems associated with the prior art devices for providing rapid hot water on-demand from a hot water source to an ultimate point of use. A hot water supply line is provided between the hot water source and the point of use within a structure. A diverter valve is installed within the hot water supply line upstream of the point of use for temporarily diverting cold water present in the hot water supply line to a drain to thereby purge cold water from the hot water supply line. The diverter valve has an open state and a closed state. The open state of the diverter valve can be set for a predetermined interval, the predetermined interval being directly related to a calculated heat loss for hot water being transferred over a known distance from the hot water source to the ultimate point of use within the structure.

Preferably, the diverter valve is selected from the group consisting of thermostatically controlled and electrically timed solenoid valves although other styles and types of valves could be utilized, if desired. The preferred diverter valve can be operated on either DC current, as where an existing structure is being retrofitted, or on AC current, as where a new structure is being hard wired during new construction. The predetermined interval of operation for the solenoid valve begins when a user presses a switch located proximate the point of use, whereby a controlled flow of cold water is diverted from the hot water line to thereby cause rapid delivery of hot water at the point of use when the timing cycle is complete.

In one embodiment of the invention, the system includes a wireless transformer for actuating the solenoid valve having an associated remote wireless switch. In this case, the predetermined interval for the solenoid valve begins when a user actuates the remote wireless switch. While a wireless switch provides convenience of installation, it is not necessary that the switching system be wireless. The switch can easily comprise a simple on/off switch which is wired into the circuitry of the solenoid valve and which is thrown by a user at the point of use to initiate the operation of the diverter valve.

The solenoid valve is preferably battery operated in cases where an existing structure is being retrofitted and no AC outlet is present at the point of use. The battery source can conveniently be selected from the group consisting of alkaline batteries, lithium-ion batteries, nickel cadmium batteries, nickel metal hydride batteries and rechargeable batteries of one or more of the above types.

The source of hot water in the system supplies water to the water supply line at an elevated temperature above ambient and wherein the timing cycle of the solenoid valve is set to supply hot water at the point of use at the same approximate temperature once the timing cycle is complete. The supply of hot water to the point of use occurs rapidly once the user has activated the diverter valve cycle with the switch located in proximity to the point of use.

Additional objects, features and advantages will be apparent in the written description which follows.

BRIEF DESCRIPTION OF THE DRAWINGS

FIG. 2 is a simplified schematic illustrating the operation of the mechanical components of the system of the invention.

FIG. 3 is a view similar to FIG. 2, but illustrating one embodiment of the electrical components of the system of the invention in schematic fashion.

FIG. 4 is a view of the electrical panel and switch used in the system of the invention, in this case powered by a 12 volt DC power source, it being understood that other voltages could be used, as well.

DETAILED DESCRIPTION OF THE INVENTION

Figure 1:
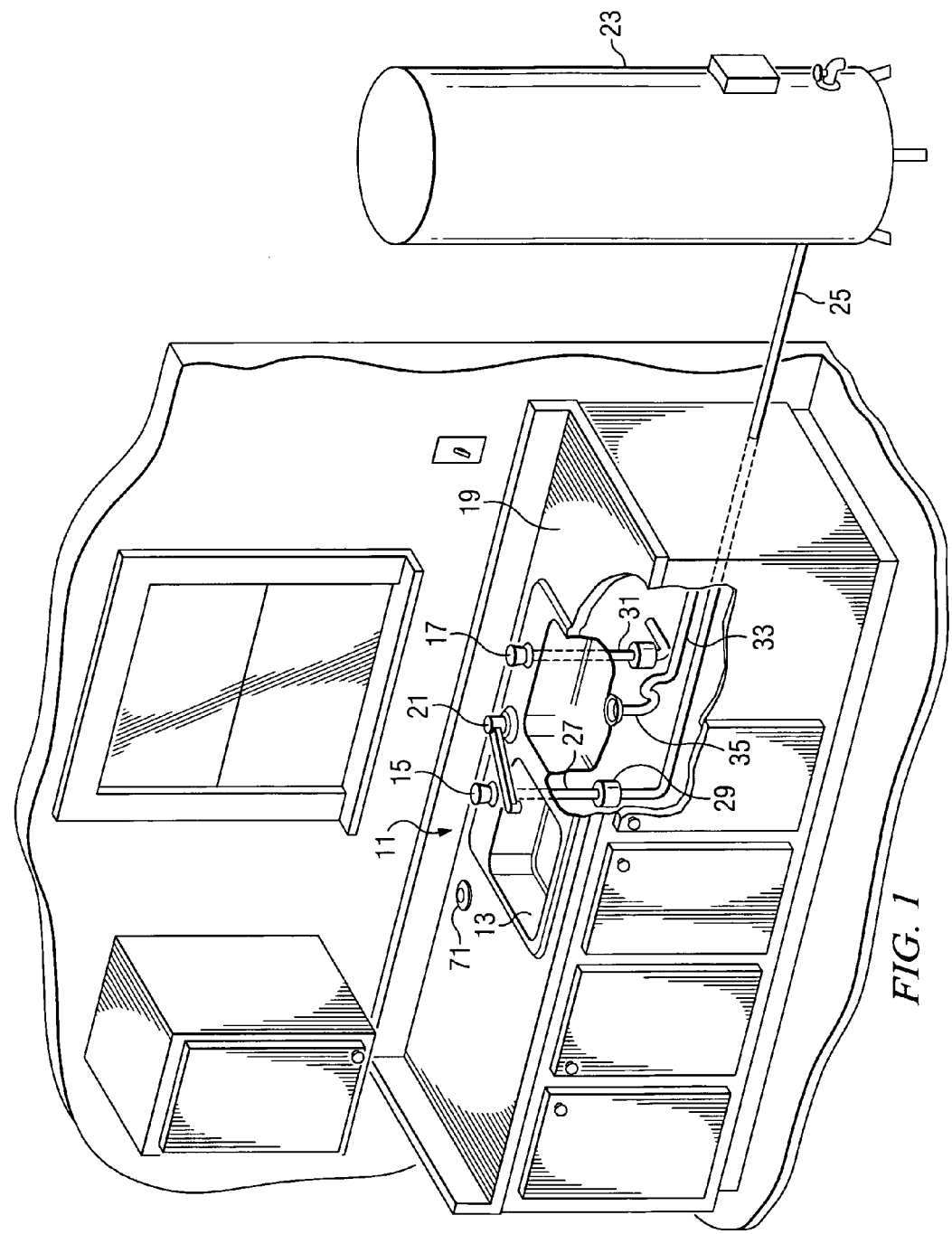
FIG. 1 is a perspective view, partly broken away, of a typical kitchen sink or bathroom lavatory having an apparatus of the invention installed thereon.

Turning to FIG. 1, there is shown the general environment of the present invention. FIG. 1 illustrates a sink 11 of the type found in a typical residential dwelling, or which could be found in a commercial building or industrial setting. While FIG. 1 illustrates a kitchen sink, it will be understood that the method and apparatus of the present invention can be applied to a bathroom lavatory, or to a bathtub or shower installation or other facility of the same general type, assuming access to the necessary plumbing is available. When the term "sink" is used in this discussion, it is intended to encompass a sink, lavatory, bathroom tub, or shower, etc.

The sink shown in FIG. 1 is conventional in nature and includes a pair of side-by-side basins 13. A hot and cold water knob 15, 17 are mounted at the level of a counter top 19 and supply water to the common faucet 21.

As illustrated in simplified fashion in FIG. 1, a water heater 23 has a hot water supply line 25 which communicates with a hot water conduit 27 under the sink which, in turn, supplies hot water through the valve and knob 15 to the common faucet 21. The water heater 23 will be referred to as the "source" in the discussion which follows and the faucet 21 will be referred to as the "point of use." While a traditional upright water heater 23 is shown in FIG. 1, it will be understood that the hot water source could be a boiler or other device for supplying potable water at an elevated temperature above ambient. A stop cock 29 is located in the hot water conduit 27 in order to turn hot water in the supply line 25 on and off for maintenance type operations. A separate cold water supply line communicates cold water through the conduit 31 to the valve knob 17 and the common faucet 21. The sink also has a drain line 33 which is typically provided with a P-trap 35.

The on-demand system of the invention for rapidly delivering hot water to a point of use can be adapted to the typical home plumbing arrangement illustrated in FIG. 1. Typically, the water heater 23 is located at some distance from the sink installation 11. For example, if the water heater 23 is located near the kitchen plumbing, then the hot water supply line 25 might be required to traverse a distance of 100 feet or more to reach the lavatory sink in the bathroom of the dwelling. As mentioned in the background discussion, general heat transfer principles dictate that hot water will reduce heat in accordance with a number of variable in this type arrangement, which variables include such things as the type of hot water conduit material chosen, the surrounding insulation if any is present, the temperature differential with respect to the surrounding ambient conditions as well as the length of the hot water supply line from the hot water source to the point of discharge.

Generally speaking, the longer the line, the greater the area through which the heat may be transferred and the greater the heat loss. Such transfer of heat is typically more pronounced during the winter at which time there is a greater temperature differential between the hot and cold sides of the water supply system through which the heat is transferred. The periods of heat transfer loss are generally greatest during periods of non-use when the water stands in the hot water supply line. General principles of thermodynamics dictate that the heat transfer in the hot water supply line is in the direction that will establish equilibrium with the surrounding conditions of the line.

As a result of the above factors, a user of a water supply system such as that shown in FIG. 1 will be subjected to the inconvenience of an initial cold flow of water through the hot water supply line 27. The duration of the cold water flow again depends upon the various factors enumerated above and is primarily related to the distance at which the water heater 23 is located from the sink 11. The greater the distance, the greater the heat loss and subsequent delay in receiving hot water from the tap of the faucet 21.

Turning now to FIGS. 2 and 3, there is shown a simplified, schematic illustration of the operation of the components of the present invention. FIG. 2 shows, in simplified fashion, a source of hot water, such as water heater 37, which is supplied by a cold water inlet 39 through a check valve 41. The source 37 communicates with the point of use 43 by means of a hot water supply line 45. The supply line 45 communicates with a hot water faucet 47 through a hot water stop cock 49. In a similar fashion, a cold water supply line 51 communicates cold water from the inlet 39 through a stop cock 53 to a cold water faucet 55.

The system illustrated in FIG. 2 also includes a T-element (approximately at 57 in FIG. 2) which has an associated branch conduit 59. The branch conduit 59 has a diverter valve 61 located therein. When the diverter valve 61 is opened, cold water initially present in the hot water supply line 45 is diverted through the branch conduit 59 to the drain 63.

FIG. 3 illustrates the associated electrical components for the system illustrated in FIG. 2. In one embodiment, the electrical components simply comprise an electrical timer circuit 65 powered by a 12 volt DC power supply 67 for actuating the diverter valve, in this case electrically operated solenoid valve 69. The solenoid valve has an open state and a closed state. The open state of the valve 69 can be set for a predetermined interval. The predetermined interval is directly related to a calculated heat loss for hot water being transferred over a known distance from the hot water source 37 to the ultimate point of use 43 within the structure.

While the preferred diverter valve 61 is selected from the group consisting of electrically timed solenoid valves and thermostatically controlled solenoid valves, it will be appreciated that other type valves could be used as well. For example, a screw controlled valve could be utilized. In one of the embodiments which follow, the solenoid valve 69 is operated on DC current. In another embodiment of the invention, the solenoid valve 69 is operated on AC current.

The predetermined timing interval for the solenoid valve 69 can be set to begin when a user presses a switch located proximate the point of use 43. For example, note switch 71 in FIG. 1 which is located in the counter top of the sink installation. The electrical switch 71 is wired within the power circuitry (67 in FIG. 3) so that pushing the switch button actuates the timer 65, opens the solenoid 69, and causes a controlled flow of cold water to be diverted from the hot water line 45 to the drain 63 to thereby cause rapid delivery of hot water at the faucet 47 once the timing cycle is complete.

As will be described in the discussion which follows, the predetermined interval for the solenoid valve 69 can also be initiated by installing a wireless transformer for actuating the solenoid valve 69 with an associated remote wireless switch. In this case, the predetermined interval for the solenoid valve begins when a user actuates the remote wireless switch to divert the flow of cold water to the drain 63.

Figure 6:
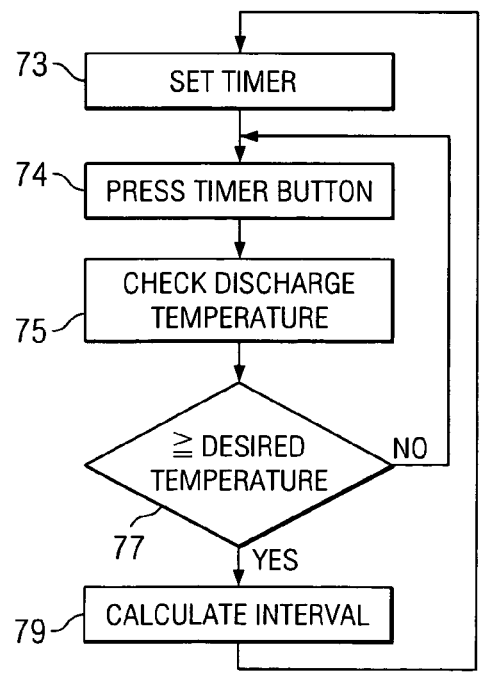
FIG. 6 is a block diagram of the steps involved in the installation and use of the apparatus of the invention in supplying rapid hot water on-demand from the hot water source to the point of use.

As mentioned above, the system of the invention is an on-demand system for rapidly delivering hot water through a plumbing system to a hot water outlet. FIG. 6 is a simplified block diagram illustrating the steps in determining the timing cycle for the solenoid valve to achieve speedy hot water. The timing cycle determines the interval during which the solenoid valve is in the "open state", the interval being directly related to a calculated heat loss for hot water being transferred from the hot water source to the point of use. For example, the system would first be installed as explained with respect to FIGS. 1–3. The timer circuit 65 is first set at the minimal point, as determined by the particular manufacture of timer, generally about 3 seconds, as shown in the step 73. When the hot water line is in the cold state, the user then presses the timing button in a step 74, allowing water to run to the drain for 3 seconds. The discharge temperature at the hot water outlet is then manually checked in a step 75. If the desired hot water temperature is not available, the timing button is pressed again, as in step 74. The discharge temperature is again checked in step 75. This operation is continued until the desired hot water temperature is available in step 77. The user then calculates the "predetermined interval" that the valve is in the open state by multiplying the number of button presses times the 3 second interval to obtain a total number of seconds required to deliver the desired hot water temperature at the point of use.

In operation, the user then turns the stop cock (49 in FIG. 3) off. The timer can now be set and checked without running any water. The stop cock 49 is then turned on. When the hot water line returns to its cold state, the user can press the timing button and the desired hot water temperature will be rapidly available.

Figure 5:
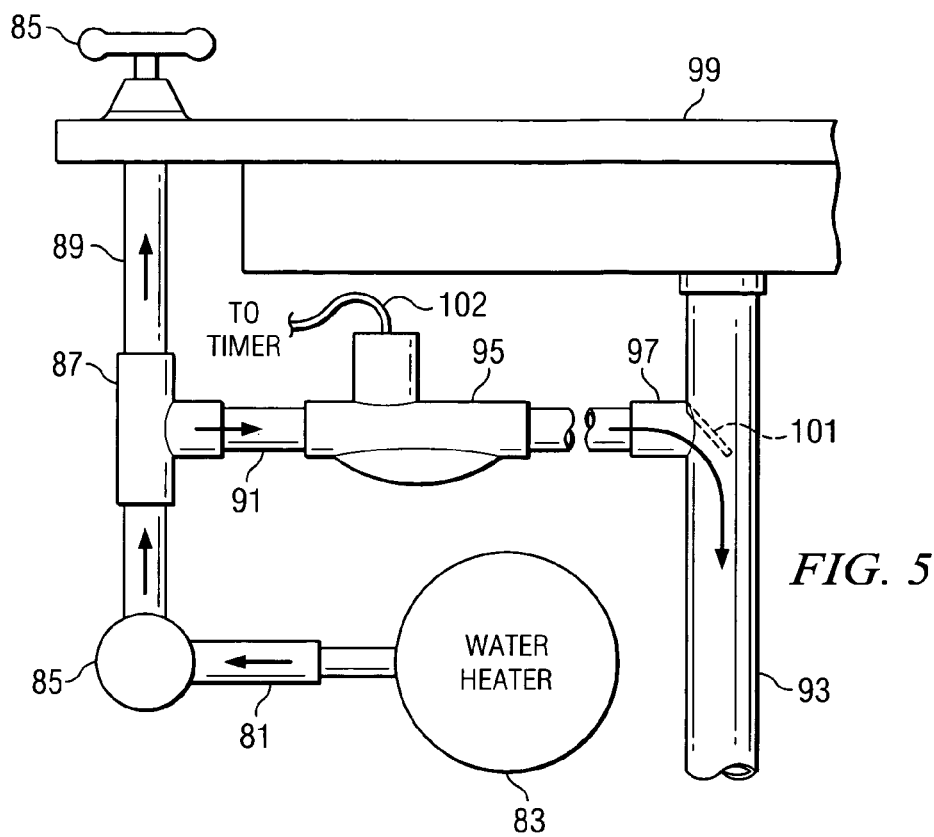
FIG. 5 is a view of the mechanical components of the invention which are used with the electrical panel of FIG. 4.

FIGS. 4 and 5 illustrate a first embodiment of the components of the invention which utilize a DC power source. While a 12 volt DC power source is used to illustrate the invention, it will be understood that other DC power sources may also be commercially available and convenient to implement. For example, the power source may be 14.5 volt DC, 16 volt DC, 18 volt DC, etc. This version of the system of the invention can conveniently be utilized in existing homes or structures where an AC power outlet is not located proximate the hot water point of use. The components illustrated in FIGS. 4 and 5 can be easily installed, for example, within the kitchen cabinet area illustrated in FIG. 1, by a home owner without the necessity of a plumber. Because the system operates on, e.g., a 12 volt DC power source, it is not necessary to install additional AC wiring or outlets. The mechanical components illustrated in FIG. 5 include the hot water supply line 81 connecting the source 83 to the point of use faucet 85. A commercially available stop cock 85 is located between the source 83 and point of use 85. Most modern plumbing illustrates feature the stop cock 85 making the installation of the T-element 87 relatively easy. Installing the T-element within the hot water inlet 89 provides a branch conduit 91 for temporarily diverting cold water present in the hot water supply line 81 to a drain 93 to thereby purge cold water from the hot water supply line 81.

An electrically operated solenoid valve 95 is located within the branch conduit 91. The valve 95 can be switched between open and closed positions to allow water to be diverted through the branch conduit 91 to the drain 93. The branch conduit 91 enters a drain entrance point 97 located below the sink 99. Note that a downwardly inclined baffle 101 is located within the drain pipe 93 adjacent the entrance point 97 for directing the flow of cold water downwardly toward the drain 93.

The electrically operated solenoid valve 95 is connected by a suitable wiring 102, 104 to the control panel 103 illustrated in FIG. 4. The control panel 103 includes as 12 volt timer 105 which is adjustable by means of the settings knob 107 between, for example, a 3 to 30 second timing interval. The commercially available 12 volt timing circuit 105 is powered by a suitable DC power source such as the battery pack 109. Any number of battery sources can be utilized such as the typically available selection of alkaline batteries, lithium, ion batteries, nickel cadmium batteries and nickel hydride batteries and rechargeable batteries, for example. Because the low current requirement needed to operate the timer circuit 105, a conventional battery pack 109 will normally last a number of months or even years without requiring replacement. Because the components illustrated in FIG. 4 can be battery powered, it is not generally necessary to undergo the expense of installing a separate AC outlet underneath the sink 99. As will be discussed further, however, an AC power source could be preferable if there is a 110 volt already present under the sink 99.

The electrical control panel 103 of the system also includes a wireless transformer 111 for actuating the timing circuit 105, and, in turn, the solenoid valve 95 by means of a remote wireless switch 113 which can be located in any convenient spot adjacent the point of use. The use of the wireless transformer 111 and remote wireless switch 113 eliminates the need to run unnecessary wiring or the need to cut unnecessary holes in counter tops or wall spaces adjacent the point of use.

Figure 7:
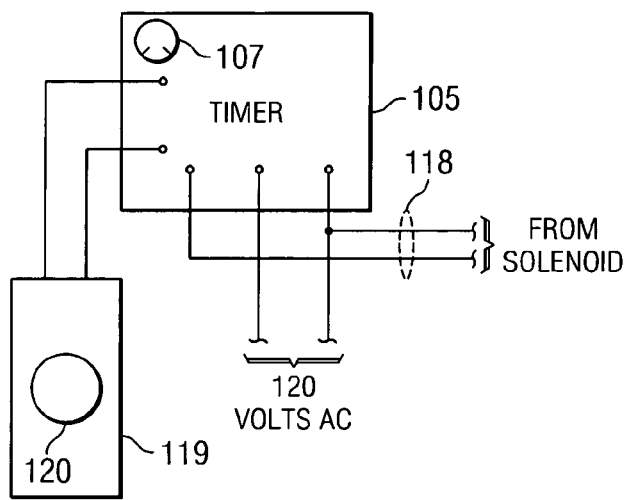
FIG. 7 is a view of an alternate embodiment of the electrical panel used with the system of the invention, in this case powered by an AC power source.
Figure 8:
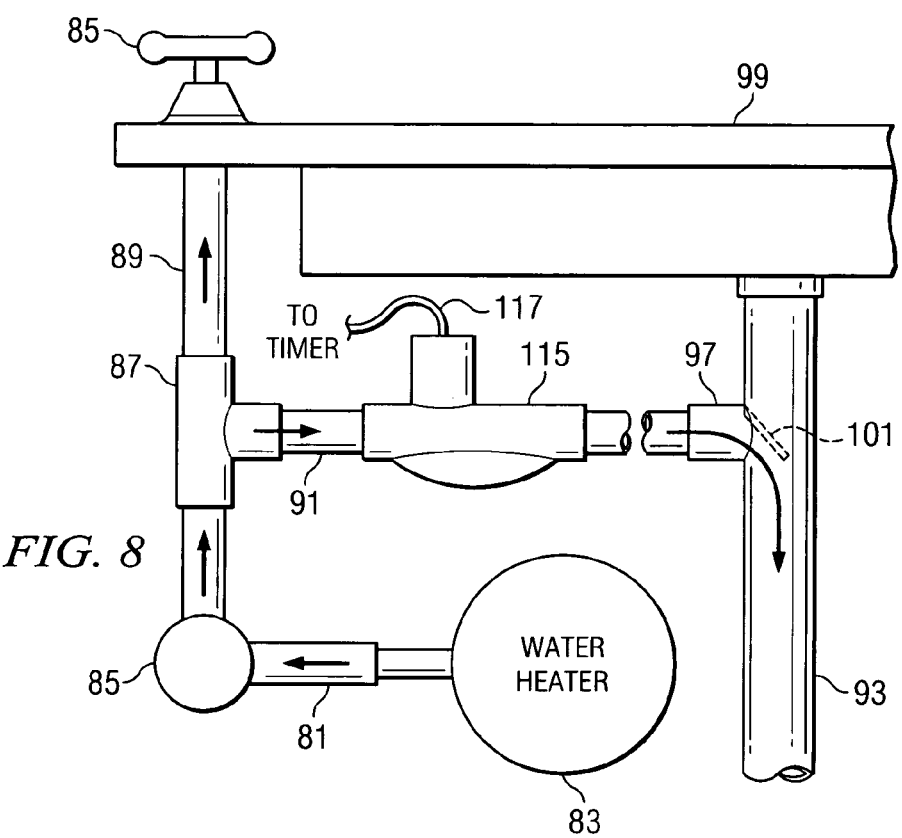
FIG. 8 is a view of the mechanical components of the system of the invention used with the electrical panel of FIG. 7.

FIGS. 7 and 8 illustrate an alternative wiring arrangement where an AC power source is adjacent the point of use. With reference to FIG. 8, the components utilized are the same as those discussed with reference to FIG. 5 except than an AC powered solenoid valve 115 has been installed within the branch conduit 91. Suitable wiring 117, 118 connects the solenoid 115 to the timing circuit 105. In this case, rather than the wireless transformer 111, a traditional on/off switch 119 is hardwired to the timing circuit 105. The predetermined interval of the timing circuit 105 is initiated by a user pressing the button 120 of the on/off switch 119. Otherwise, the operation of the system shown in FIGS. 7 and 8 is identical to that system described in FIGS. 4 and 5.

It should be emphasized that the on-demand system of the invention supplies hot water at the point of use 43 which is generally of the approximate temperature of the hot water exiting the hot water source (37 in FIG. 2). For example, if the water heater 37 supplies water to the water supply line 45 at a temperature above about 100° F., the timing cycle of the solenoid valve 63 will be set to supply hot water to the hot water outlet 47 at about the same approximate temperature once the timing cycle is complete. There are no recirculating loops are blending of the water supplies in order to supply "warm" water to the tap 47.

An invention has been provided with several advantages. The on-demand hot water system of the invention is simple in design and economical to implement. The system does not involve the expense of a recirculating loop or require changes in elevation or other exotic elements. The hardware components of the system are commercially available from a variety of sources and are commonly known to those familiar with the electrical and plumbing trades. Because of the simplicity of the system, there is little to go wrong and maintenance requirements are minimum.

Because the system has a low current draw, it can be powered from a battery operated circuit and does not require the installation of AC outlet beneath the sink region of the sink region. Even with a water heater located, for example, 40 feet from the discharge point, hot water can easily be provided in 10 seconds or less using the apparatus and system of the invention. The water which is provided is at the approximate temperature of the hot water leaving the water heater.

While the invention has been shown in only one of its forms, it is thus limited but is susceptible to various changes and modifications without departing from the spirit thereof.

What is claimed is:

1. An on-demand method for rapidly delivering hot water through a plumbing system from a hot water source to an ultimate point of use, the method comprising the steps of:
   providing a hot water supply line between the hot water source and the point of use within a structure;
   installing a diverter valve within the hot water supply line upstream of the point of use for temporarily diverting cold water present in the hot water supply line to a drain to thereby purge cold water from the hot water supply line;
   wherein the diverter valve has an open state and an closed state, and wherein the open state of the diverter valve can be set for a predetermined interval, the predetermined interval being directly related to a calculated heat loss for hot water being transferred over a known distance from the hot water source to the ultimate point of use within the structure.

2. The method of claim 1, wherein the diverter valve is selected from the group consisting of thermostatically controlled and electrically timed solenoid valves.

3. The method of claim 2, wherein the solenoid valve is operated on DC current.

4. The method of claim 2, wherein the solenoid valve is operated on AC current.

5. The method in claim 2, wherein the predetermined interval for the solenoid valve begins when a user presses a switch located proximate the point of use, whereby a controlled flow of cold water is diverted from the hot water line to thereby cause rapid delivery of hot water at the point of use when the timing cycle is complete.

6. The method of claim 2, wherein the method further comprises installing a wireless transformer for actuating the solenoid valve having an associated remote wireless switch, and wherein the predetermined interval for the solenoid valve begins when a user actuates the remote wireless switch, whereby a controlled flow of cold water is diverted from the hot water line to thereby cause rapid delivery of hot water at the point of use when the timing cycle is complete.

7. The method in claim 2, wherein the solenoid valve is battery powered by a battery source selected from the group consisting of alkaline batteries, lithium-ion batteries, nickel cadmium batteries, nickel metal hydride batteries and rechargeable batteries of one or more of the above types.

8. The method of claim 1, wherein the source of hot water supplies water to the water supply line at an elevated temperature above ambient and wherein the timing cycle of the solenoid valve is set to supply hot water at the point of use at the same approximate temperature once the timing cycle is complete.

9. An on-demand apparatus for attachment to a plumbing system in a building having a hot water point of use, for rapidly delivering hot water through the plumbing system to the point of use, the apparatus comprising:
   a diverter valve attachable to a building hot water supply line upstream of the point of use for temporarily purging cold water from the hot water supply line based upon a timing cycle which is set for a predetermined interval by a user at the hot water point of use location, the predetermined interval being directly related to the distance of the hot water supply source from the point of use, whereby a controlled flow of cold water is diverted from the hot water supply line to thereby cause rapid delivery of hot water at the point of use outlet when the timing cycle is complete;
   wherein a T-element is installed beneath a lavatory in the building between a hot water pet cock and a hot water outlet tap, the T-element having an associated branch conduit for conveying diverted water to a drain;
   wherein the diverter valve is located in the branch conduit, whereby opening the diverter valve causes cold water in the hot water supply line to be diverted to the lavatory drain.

10. The apparatus of claim 9, wherein the diverter valve is selected from the group consisting of thermostatically controlled and electrically timed solenoid valves.

11. The apparatus of claim 10, wherein the solenoid valve is operated on DC current.

12. The apparatus of claim 10, wherein the solenoid valve is operated on AC current.

13. The apparatus of claim 10, wherein the predetermined interval for the solenoid valve begins when a user presses a switch located proximate the point of use, whereby a controlled flow of cold water is diverted from the hot water line to thereby cause rapid delivery of hot water at the point of use when the timing cycle is complete.

14. The apparatus of claim 10, wherein the method further comprises installing a wireless transformer for actuating the solenoid valve having an associated remote wireless switch, and wherein the predetermined interval for the solenoid valve begins when a user actuates the remote wireless switch, whereby a controlled flow of cold water is diverted from the hot water line to thereby cause rapid delivery of hot water at the point of use when the timing cycle is complete.

15. The apparatus of claim 10, wherein the solenoid valve is battery powered by a battery source selected from the group consisting of alkaline batteries, lithium-ion batteries, nickel cadmium batteries, nickel metal hydride batteries and rechargeable batteries of one or more of the above types.

16. The apparatus of claim 9, wherein the source of hot water supplies water to the water supply line at an elevated temperature above ambient and wherein the timing cycle of the solenoid valve is set to supply hot water at the point of use at the same approximate temperature once the timing cycle is complete.

17. A homeowner installable on-demand system for providing rapidly available hot water from a water heater to a hot water faucet in a home, the system comprising:
   at least a selected one of a sink, a shower, and a tub which includes a hot water supply line and a hot water faucet coupled to the hot water supply line;
   a T-element installed in the hot water supply line between a hot water stop cock and the hot water faucet, the T-element having an associated branch conduit for conveying diverted water to a drain;
   a diverter valve installed within the branch conduit, the diverter valve comprising an electrically timed solenoid valve with a timing cycle which is set for a predetermined interval, the predetermined interval being directly related to the distance of the hot water faucet from the hot water heater;
   electrical on-off switching means located in proximity to the selected one of the sink, shower, and tub for actuating the electrically timed solenoid valve, whereby a user can initiate the predetermined timing interval by actuating the switching means each time hot water is desired at the hot water outlet.

18. The homeowner installable on-demand system of claim 17, wherein the switching means comprises a wireless transformer for actuating the solenoid valve and an associated remote wireless switch.

19. The homeowner installable on-demand system of claim 17, wherein the switching means comprises an electrical switch hard wired in a circuit of the solenoid valve for actuating the solenoid valve when the switch is operated by a user.

20. The homeowner installable on-demand system of claim 13, wherein the solenoid valve is operable on DC current and wherein a battery power source is located adjacent the solenoid valve for powering the solenoid valve.

21. The homeowner installable on-demand system of claim 13, wherein the solenoid valve is operable on AC current and the valve is wired into a portion of the AC circuit of the home.

* * * * *